United States Patent
Sato

(10) Patent No.: US 7,733,428 B2
(45) Date of Patent: Jun. 8, 2010

(54) AUDIO-VISUAL (AV) APPARATUS AND ITS CONTROL METHOD

(75) Inventor: Shojiro Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/428,308

(22) Filed: Apr. 22, 2009

(65) Prior Publication Data

US 2010/0045877 A1 Feb. 25, 2010

(30) Foreign Application Priority Data

Aug. 22, 2008 (JP) ............................. 2008-213672

(51) Int. Cl.
*H04N 7/00* (2006.01)
*H04N 5/44* (2006.01)

(52) U.S. Cl. .................... 348/734; 348/552; 348/14.05; 348/14.02; 340/825.72; 340/310.16; 455/352

(58) Field of Classification Search ................. 348/734, 348/14.02, 14.04, 14.05, 552, 114; 340/426.13, 340/815.6, 825.72, 825.69, 310.16; 455/352, 455/92; 725/81, 133; 341/176
See application file for complete search history.

(56) References Cited

U.S. PATENT DOCUMENTS

| 6,208,384 | B1 * | 3/2001 | Schultheiss ................. 348/552 |
| 6,975,364 | B2 * | 12/2005 | Lin ............................ 348/552 |
| 7,375,673 | B2 * | 5/2008 | Spilo ........................... 341/176 |
| 7,428,023 | B2 * | 9/2008 | Allen et al. .................. 348/734 |
| 7,508,460 | B1 * | 3/2009 | Gerstman .................... 348/734 |

FOREIGN PATENT DOCUMENTS

| JP | H03-245684 A | 11/1991 |
| JP | H09-215064 A | 8/1997 |
| JP | H09-215065 A | 8/1997 |
| JP | H09-215066 A | 8/1997 |
| JP | 2004-096548 A | 3/2004 |
| JP | 2007-043701 A | 2/2007 |
| JP | 2007-258984 A | 10/2007 |
| JP | 2008-028582 A | 2/2008 |
| WO | WO 98/03012 | 1/1998 |

OTHER PUBLICATIONS

Explanation of Non-English Language Reference(s).

* cited by examiner

*Primary Examiner*—David L Ometz
*Assistant Examiner*—Jean W Désir
(74) *Attorney, Agent, or Firm*—Knobbe, Martens, Olson & Bear LLP

(57) ABSTRACT

According to one embodiment, an audio-visual apparatus that has received operation information transmitted using infrared receives a response signal via a radio frequency from a remote controller set to a combination mode transmitting operation information using both infrared and a radio frequency. The remote controller that has received the response signal transmitted from the AV apparatus within a predetermined time is automatically set to a temporary infrared only mode transmitting operation information using infrared only in place of the combination mode.

8 Claims, 14 Drawing Sheets

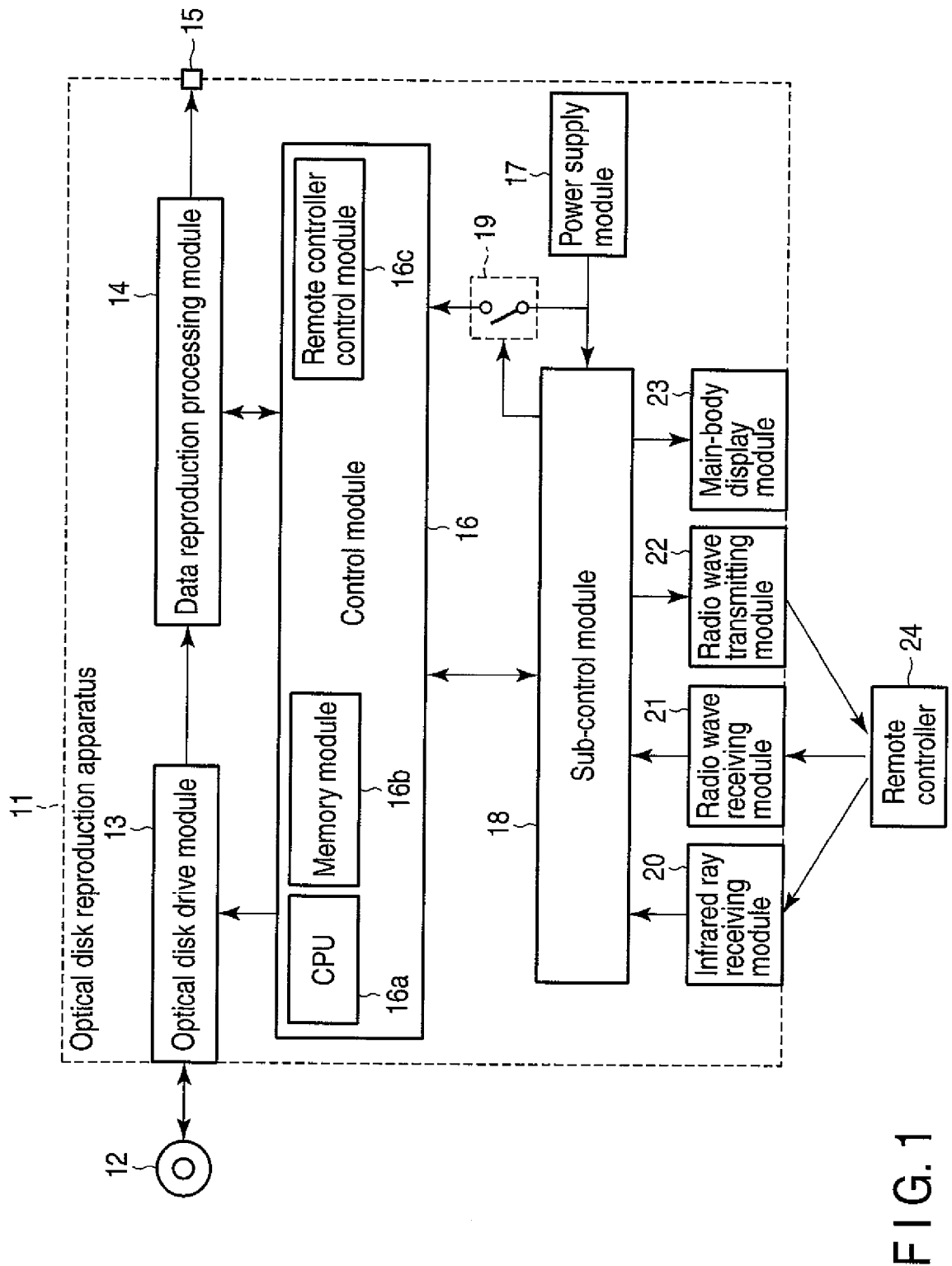
F I G. 1

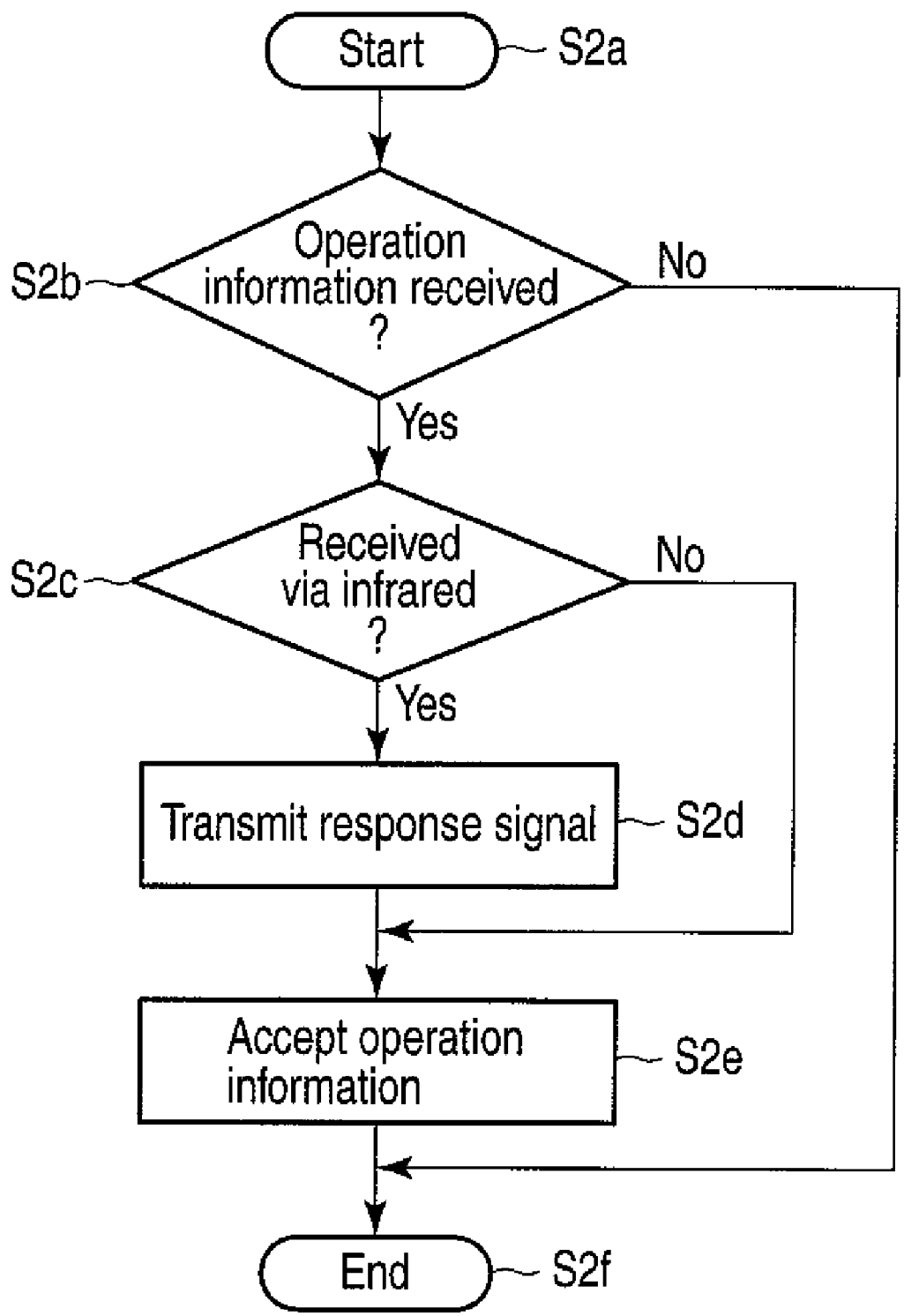
F I G. 2

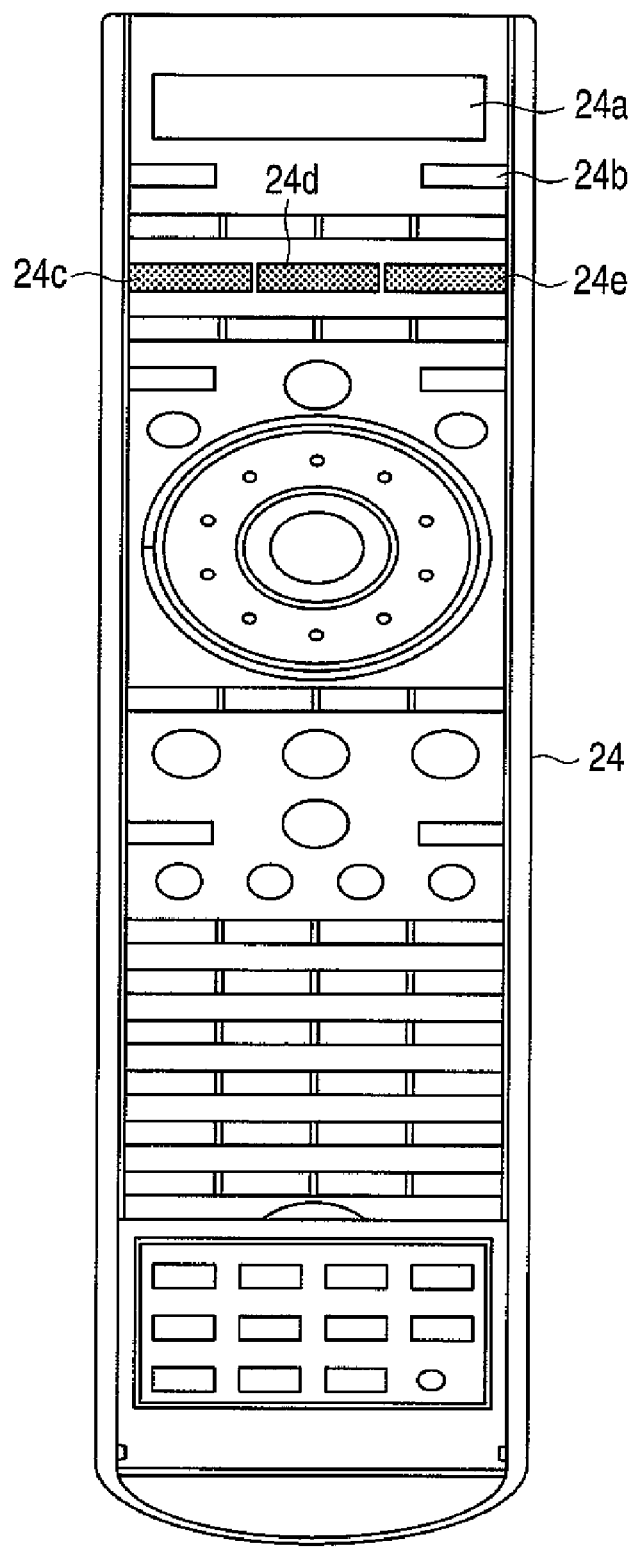
F I G. 3

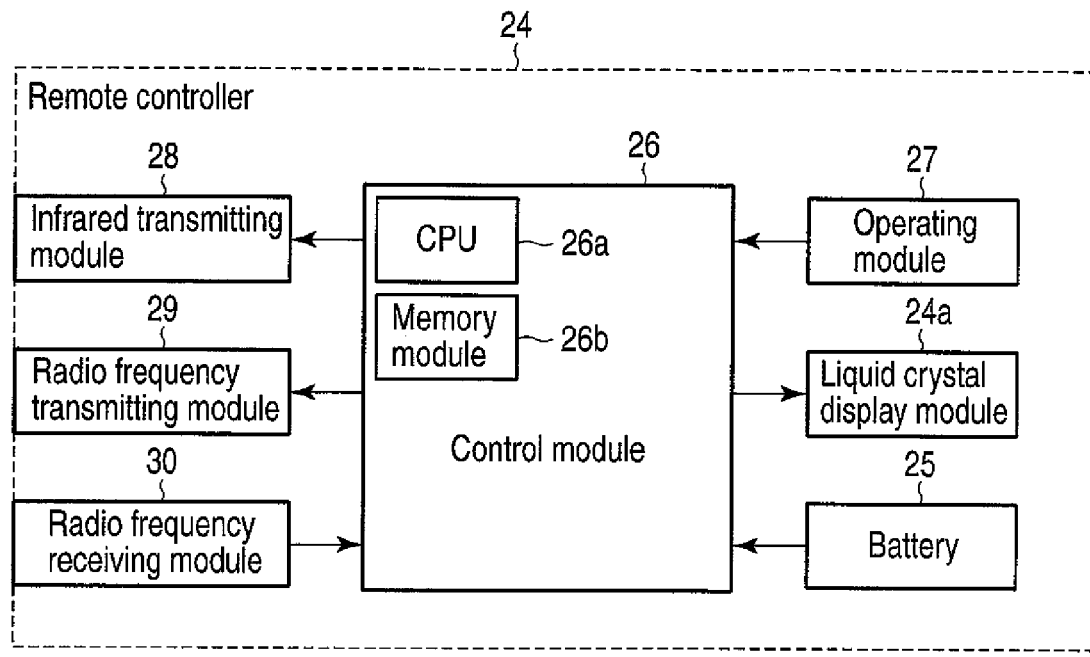
F I G. 4
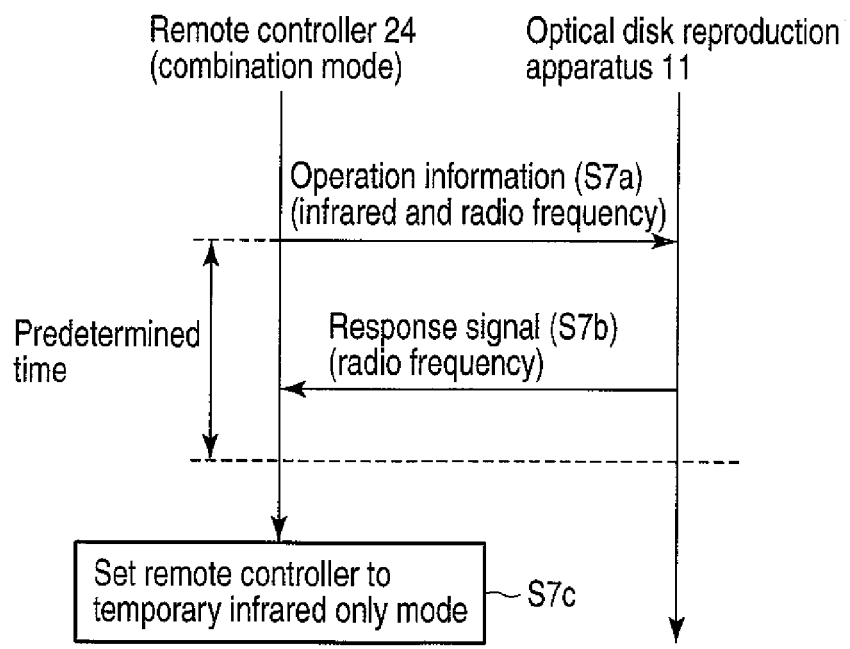
F I G. 7

AUDIO-VISUAL (AV) APPARATUS AND ITS CONTROL METHOD

CROSS-REFERENCE TO RELATED APPLICATIONS

This application is based upon and claims the benefit of priority from Japanese Patent Application No. 2008-213672, filed Aug. 22, 2008, the entire contents of which are incorporated herein by reference.

BACKGROUND

1. Field

One embodiment of the invention relates to an audio-visual (AV) apparatus operated by a remote controller using wireless transmission, and to improvement of its control method.

2. Description of the Related Art

As already known, various audio-visual (AV) apparatuses have come into wide use. An optical disk reproduction apparatus reproducing an optical disk such as a digital versatile disk (DVD) is given as one example of an AV apparatus. In the foregoing AV apparatus, the user wireless-transmits operation information using a remote controller, and thereby, the apparatus is remote-controlled to various operation states and a stop state.

In this case, for general home AV apparatuses, the following two means for wireless-transmitting operation information to the AV apparatus from a remote controller are used. One employs an infrared method of transmitting the operation information using infrared rays as a transmission medium. The other employs a radio wave method of transmitting the operation information using a radio wave as a transmission medium.

Of the foregoing methods, according to the infrared method, a remote controller must be pointed toward the AV apparatus to transmit operation information in a state that there exists no obstacle that shields infrared rays on the straight line connecting the remote controller and the AV apparatus.

Conversely, the radio wave method is a method used for performing bidirectional communication between the remote controller and the AV apparatus. Thus, even if an obstacle exists on the straight line connecting the remote controller and the AV apparatus, the operation information is transmitted to the AV apparatus, and further, it is transmitted from the AV apparatus to the remote controller.

Currently, an audio-visual (AV) apparatus that is operable using a remote controller employing both the infrared method and radio wave method, is available. This kind of remote controller operates in the following three modes. One is an infrared only mode of transmitting operation information using only infrared rays. Another is a radio wave only mode of transmitting the operation information using only a radio wave. Another is a combination mode of simultaneously transmitting information using both infrared and a radio wave. The foregoing modes are settable by the user.

An AV apparatus receiving the operation information from such a remote controller has the following functions. One is a function of receiving the operation information transmitted using infrared rays. The other is a function of receiving the operation information transmitted using a radio wave. The foregoing AV apparatus can handle the operation information received using either of the foregoing functions.

As described above, the AV apparatus is remote-controlled using the remote controller having both the infrared method and the radio wave (frequency) method. This serves to obtain the advantages of the foregoing two methods. However, according to the combination mode, the remote controller simultaneously transmits the same content operation information using infrared rays and a radio frequency. For this reason, power consumption is greatly increased; as a result, this is a factor of shortening the lifetime of a battery.

Jpn. Pat. Appln. KOKAI Publication No. 2008-28582 discloses the following technique. According to the technique, the power supply to a radio transmit/receive module is stopped in a standby state, and power is supplied to an infrared transmit/receive module only. In this way, power consumption of a recorder is reduced. Further, when an operation instruction signal for changing the recorder from the standby state to a normal operation state, the recorder transmits a radio response signal to the remote controller to stop the transmission of the operation instruction signal. In the manner as described above, the power consumption of the remote controller is reduced.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing the configuration of a main signal processing system of an optical disk reproduction apparatus according to one embodiment of the invention;

FIG. 2 is a flowchart to explain the main operation executed by the optical disk reproduction apparatus in the embodiment;

FIG. 3 is a view showing the appearance of a remote controller of the optical disk reproduction apparatus in the embodiment;

FIG. 4 is a block diagram showing the configuration of the main signal processing system of the remote controller in the embodiment;

FIG. 7 is a view to explain an operation sequence of an optical disk reproduction apparatus and a remote controller in the embodiment;

DETAILED DESCRIPTION

Figure 5:
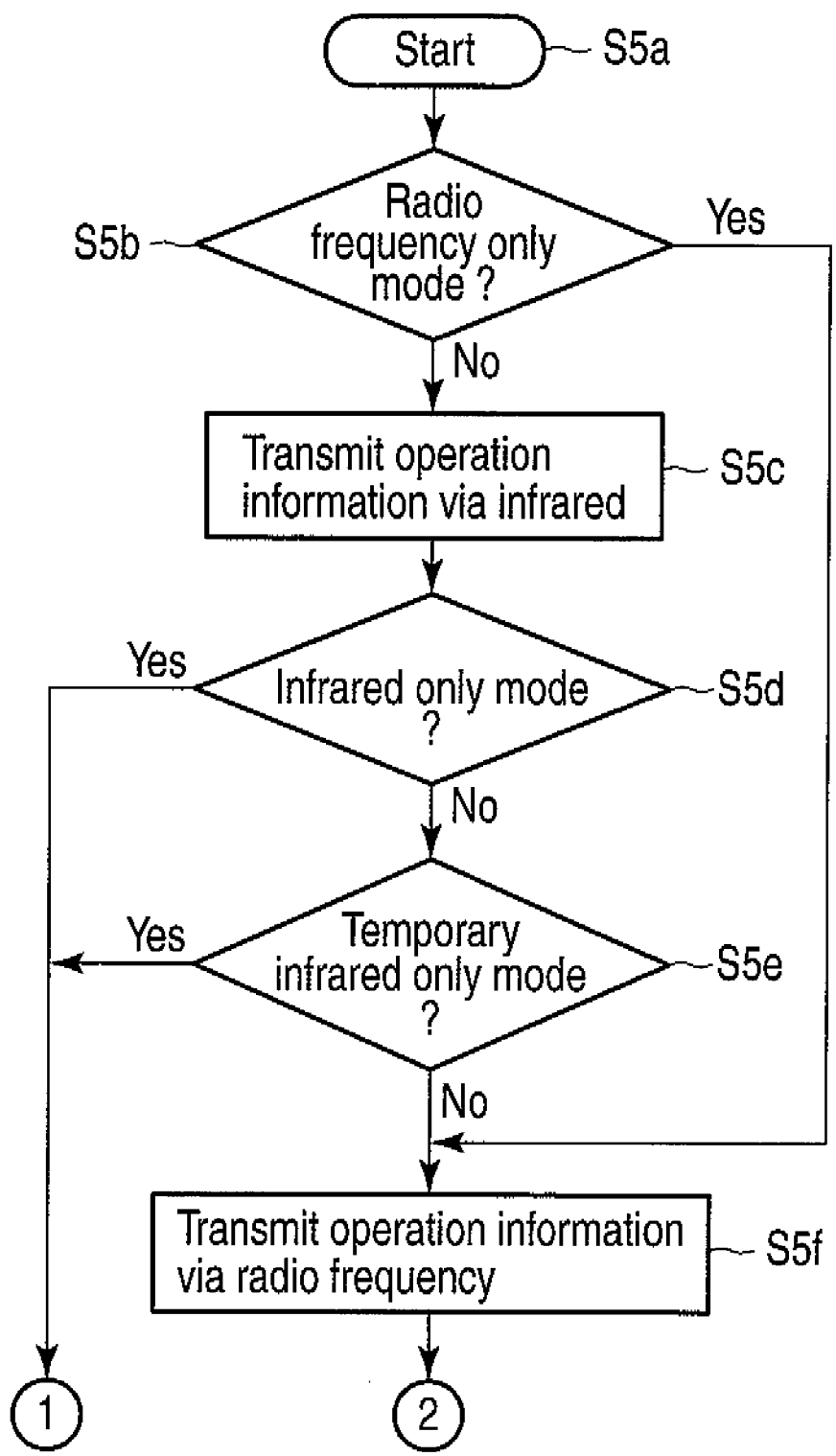
FIG. 5 is a flowchart to explain part of the main operation executed by the optical disk reproduction apparatus in the embodiment.

Various embodiments according to the invention will be described hereinafter with reference to the accompanying drawings. In general, according to one embodiment of the invention, an audio-visual apparatus that has received operation information transmitted using infrared receives a response signal via a radio frequency from a remote controller set to a combination mode transmitting operation information using both infrared and a radio frequency. The remote controller that has received the response signal transmitted from the AV apparatus within a predetermined time is automatically set to a temporary infrared only mode transmitting operation information using infrared only in place of the combination mode.

FIG. 1 shows the main signal system of an optical disk reproduction apparatus 11 given as a controlled apparatus described in this embodiment. The optical disk reproduction apparatus 11 can load an optical disk 12 such as a DVD so that the disk 12 is freely removable. The apparatus 11 includes an optical disk drive module 13, which reads data recorded to the loaded optical disk 12.

Then, data read from the optical disk 12 by the optical disk drive module 13 is supplied to a data reproduction processing module 14 to carry out predetermined data reproduction processing. In this way, the data is decoded to an analog video signal and an analog audio signal, and thereafter, fetched outside via an output terminal 15.

In the optical disk reproduction apparatus 11, a control module 16 collectively controls all operations including the foregoing reproduction operation of the optical disk. The control module 16 has a built-in central processing unit (CPU) 16a. The control module 16 receives operation information transmitted from a remote controller 24, described later, and controls various modules so that the operation content is reflected.

In this case, the control module 16 utilizes a memory module 16b. The memory module 16b has a read only memory (ROM), a random access memory (RAM) and a nonvolatile memory. Specifically, the ROM is stored with control programs executed y the CPU 16a. The RAM provides a work area to the CPU 16a. The nonvolatile memory is stored with various setting information and control information.

The control module 16 is in a boot state in the following manner. Namely, a conduction switch 19 is turned on based on the control of a sub-control module 18, which is in a boot state by always supplying power from a power module 17. In this way, power is supplied to the control module 16 from the power module 17, and thereby, the control module 16 is in a boot state. Via the foregoing operation, the control module 16 performs the control of carrying out the reproduction operation of the optical disk 12.

The sub-control module 18 is connected with an infrared receiving module 20, a radio frequency receiving module 21, a radio frequency transmitting module 22 and a main-body display module 23. The infrared receiving module 20 receives operation information transmitted from the remote controller 24 using infrared rays as a transmission medium. Thereafter, the module 20 functions to supply the received operation information to the sub-control module 18. The radio frequency receiving module 21 receives operation information transmitted from the remote controller 24 using a radio frequency as a transmission medium. Thereafter, the module 21 functions to supply the received operation information to the sub-control module 18.

When the operation information obtained from the infrared receiving module 20 and the radio frequency receiving module 21 has the content requesting power on, the sub-control module 18 performs the control of turning on the conduction switch 19. In this way, the sub-control module 18 functions to supply power from the power module 17 to the control module 16. When the conduction switch 18 is in a turned-on state, the sub-control module 18 supplies the operation information obtained from the infrared receiving module 20 and the radio frequency receiving module 21 to the control module 16. In this way, the control module 16 receives the operation information from the remote controller 24, and thereby, controls various modules so that the operation information is reflected.

Conversely, when the operation information obtained from the infrared receiving module 20 and the radio frequency receiving module 21 has the content requesting power off, the sub-control module 18 performs the control of turning off the conduction switch 19. Thus, the sub-control module 18 functions to stop power being supplied from the power module 17 to the control module 16.

When at least one of the control and sub-control modules 16 and 18 generates information to be transmitted to the remote controller 24, the radio frequency transmitting module 22 functions to transmit the information to the remote controller 24 using a radio frequency. Further, when at least one of the control and sub-control modules 16 and 18 generates information to be displayed outside, the main-body display module 23 functions to display the information.

The foregoing control module 16 includes a remote controller control module 16c. The remote controller control module 16c performs the following control, although the details will be described later. Specifically, when the infrared receiving module 20 receives operation information, the radio frequency transmitting module 22 transmits a response signal indicative that the operation information is received via infrared rays to the remote controller 24 using a radio frequency.

In other words, the remote controller 24 is set to a combination mode. Then, the foregoing remote controller 24 simultaneously transmits the same content operation information using infrared and a radio frequency. When the infrared receiving module 20 receives the infrared operation information, the remote controller control module 16c performs the foregoing control. Namely, the radio frequency transmitting module 22 transmits a response signal indicative that the operation information is received via infrared rays to the remote controller 24 using radio frequency.

The remote controller 24 transmits the operation information, and thereafter, receives the response signal via a radio frequency within a predetermined time via a radio frequency. In this case, the remote controller 24 is automatically set to a temporary infrared only mode of transmitting the operation information using the infrared method only. Namely, the remote controller 24 is set to the temporary infrared only mode, and thereby, the operation information is transmitted via infrared rays only after that. Therefore, power consumption is reduced; as a result, the lifetime of a battery can be lengthened compared with the case of transmitting the operation information using both infrared and a radio frequency.

In brief, when the remote controller 24 simultaneously transmits the same content operation information via both infrared and a radio frequency, the remote controller 24 receives the response signal indicative that the operation information is received via infrared. This means the following state; namely, it is confirmed that remote control via the infrared method is possible.

Thus, for example, the user performs the following action on the remote control. Specifically, the user automatically sets the remote controller 24 set to the combination mode to the temporary infrared only mode to carry out remote control via infrared only. Even if the user makes the foregoing operation, there occurs no disadvantage in the remote control of the optical disk reproduction apparatus 11; therefore, power saving can be achieved. Incidentally, a method of releasing the temporary infrared only mode of the remote controller 24 will be described later.

FIG. 2 shows a flowchart to explain the operation executed by the foregoing remote controller control module 16c. Specifically, when the operation is started (step S2a), the remote controller control module 16c determines in step S2b whether or not operation information is received in at least one of the infrared receiving module 20 and the radio frequency receiving module 21. If it is determined that the operation information is not received (NO), the modules 16c ends the operation (step S2f).

Conversely, if it is determined that the operation information is received (YES), the remote controller control module 16c determines in step S2c whether or not the operation information is received via infrared. If it is determined that the operation information is received via infrared (YES), in step S2d, the module 16c causes the radio frequency transmitting module 22 to transmit a response signal indicative that the operation information is received via infrared.

After step S2d, or conversely, if it is determined in step S2c that the operation information is not received via infrared (YES), in step S2e, the remote controller control module 16c accepts operation information received via the infrared receiving module 20 or the radio frequency receiving module 21. Then, the module 16c ends the operation (step S2f).

FIG. 3 shows the appearance of the foregoing remote controller 24. The remote controller 24 is provided with various operation keys for which the user remote-controls the optical disk reproduction apparatus 11 to various states and a stop state. According to this embodiment, a liquid crystal display panel 24a, a power key 24b, an infrared only mode key 24c, a radio frequency only mode key 24d and a combination mode key 24e are given as main keys for explaining this embodiment.

The power key 24b requests power on/off with respect to the optical disk reproduction apparatus 11. Namely, the power key 24d generates operation information for requesting turn-on/off of the foregoing conduction switch 19. The infrared only mode key 24c is used for setting the remote controller 24 to an infrared only mode of transmitting operation information using infrared only.

The radio frequency only mode key 24d is used for setting the remote controller 24 to a radio frequency only mode of transmitting operation information using a radio frequency only. The combination mode key 24e is used for setting the remote controller 24 to a combination mode of simultaneously transmitting operation information using both infrared and a radio frequency.

The liquid crystal display panel 24a displays information transmitted to the remote controller from the optical disk reproduction apparatus 11 via a radio frequency, and an internal state of the remote controller 24. For example, when the remote controller 24 transmits operation information via infrared, "IR" is displayed. Further, when the remote controller 24 transmits operation information via a radio frequency, "RF" is displayed. Furthermore, when the remote controller 24 transmits operation information via both infrared and a radio frequency, "IR/RF" is displayed.

FIG. 4 shows the configuration of a main signal processing system of the foregoing remote controller 24. The remote controller 24 includes a control module 26, which is supplied with power of a battery 25 which is in a boot state. The control module 26 includes a CPU 26a and a memory module 26b used by the CPU 26a, and collectively controls the operation of the remote controller 24.

Specifically, the control module 26 receives operation information from an operation module 27 which is collectively comprised of various operation keys provided on the remote controller 24. Then, the control module 26 performs control so that any one or both of an infrared transmitting module 28 and a radio frequency transmitting module 29 transmits the received operation information. Further, the control module 26 performs control so that the liquid crystal display panel 24a displays the internal state of the remote controller 24 and information received in a radio frequency receiving module 30.

Figure 6:
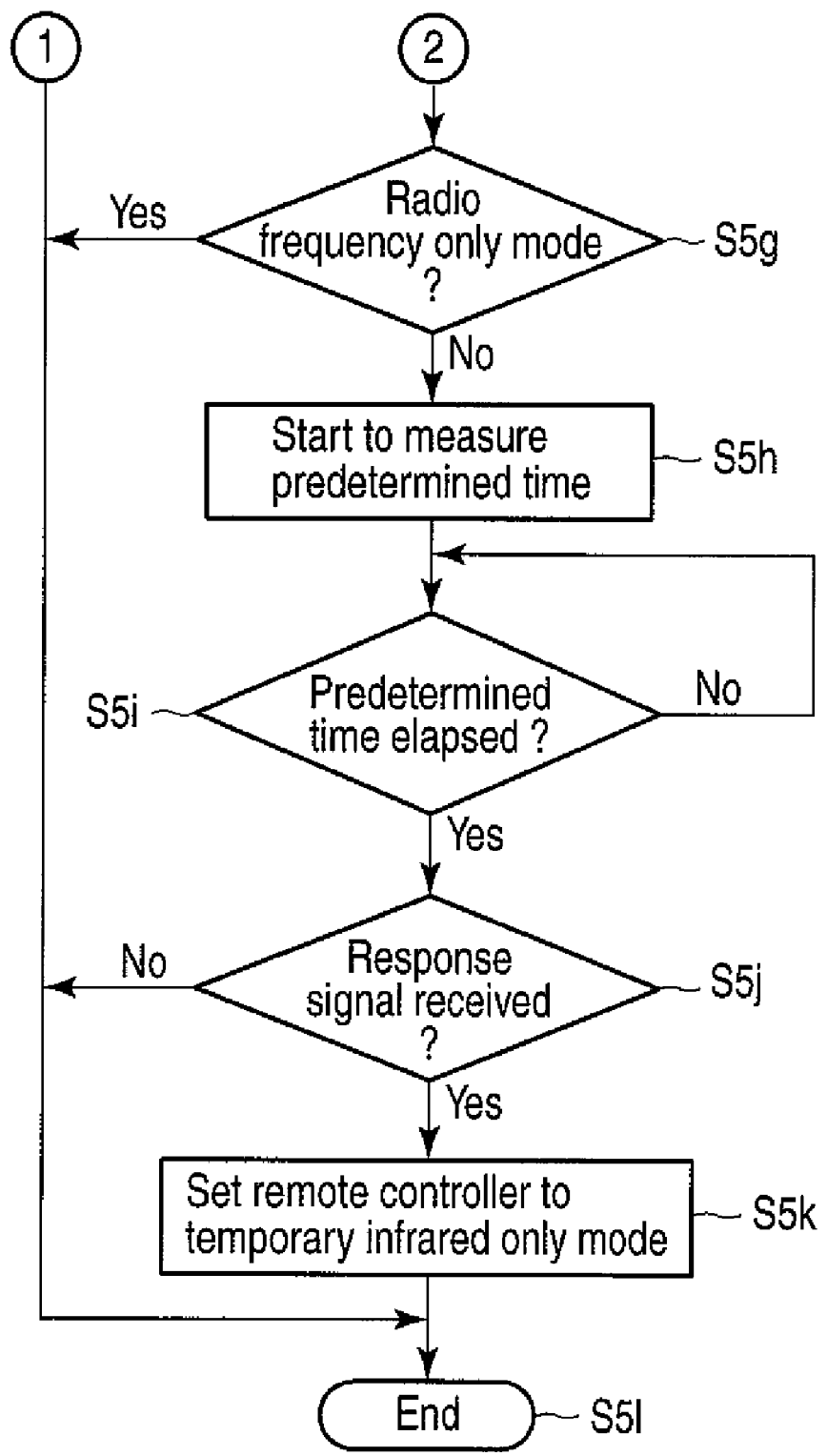
FIG. 6 is a flowchart to explain the remainder of the main operation executed by the optical disk reproduction apparatus in the embodiment.

FIGS. 5 and 6 are flowcharts to explain the operation executed by the control module 26 of the remote controller 24. Specifically, when any operation key of the operation module 27 is operated, the procedure is started (step S5a). When the procedure is started, the control module 26 determines in step S5b whether or not the remote controller 24 is set to the radio frequency only mode. If it is determined that the remote controller 24 is not set to the radio frequency only mode (NO), in step S5c, the control module 26 causes the infrared transmitting module 28 to transmit operation information corresponding to the operated key.

Thereafter, the control module 26 determines in step S5d whether or not the remote controller 24 is set to the infrared only mode. If it is determined that the remote controller 24 is set to the infrared only mode (YES), the control module 26 ends the procedure (step S5l). Conversely, if it is determined that the remote controller 24 is not set to the infrared only mode (NO), the control module 26 determines in step S5e whether or not the remote controller 24 is set to the temporary infrared only mode. If it is determined that the remote controller 24 is set to the temporary infrared only mode (YES), the control module 26 ends the procedure (step 51).

Conversely, if it is determined in step S5e that the remote controller 24 is not set to the temporary infrared only mode (NO), or it is determined that in step S5b that the remote controller 24 is set to the radio frequency only mode (YES), in step S5f, the control module 26 performs the following procedure. Namely, the control module 26 causes the radio frequency transmitting module 29 to transmit operation information corresponding to the operated key.

Thereafter, the control module determines in step S5g whether or not the remote controller 24 is set to the radio frequency only mode. If it is determined that the remote controller 24 is set to the radio frequency only mode (YES), the control module 26 ends the procedure (step S5l). Conversely, if it is determined in step S5g that the remote controller 24 is not set to the radio frequency only mode (NO), the control module 26 starts to measure a predetermined time using a built-in timer (not shown) in step S5h.

Then, the control module 26 determines in step S5i whether or not the predetermined time elapses. If it is determined that the predetermined time elapsed (YES), the control module 26 determines in step S5*j* whether or not the radio frequency receiving module 30 receives a response signal indicative that operation information is received via infrared. If it is determined that the operation information is not received (No), the control module ends the procedure (step S5*l*).

Conversely, if it is determined in step S5*j* that the response signal is received (YES), the control module 26 sets the remote controller 24 to the temporary infrared only mode in step S5*k*, and then, the control module 26 ends the procedure (step S5*l*).

FIG. 7 shows an operation sequence executed by the optical disk reproduction apparatus 11 and the remote controller 24 based on the flowcharts shown in FIGS. 5 and 6. Specifically, as shown in step S7*a*, the remote controller 24 set to the combination mode transmits operation information via infrared and a radio frequency. Thereafter, when receiving the operation information transmitted via infrared, the optical disk reproduction apparatus 11 transmits a response signal indicative that operation information is received via infrared, via a radio frequency as shown in step S7*b*.

At that time, the remote controller 24 receives the response signal from the optical disk reproduction apparatus within a predetermined time after the operation information is transmitted. In this case, as shown in step S7*c*, the remote controller 24 is set to the temporary infrared only mode. Thereafter, the remote controller 24 is controlled to transmit the operation information via infrared only until the foregoing temporary infrared only mode is released.

Figure 8:
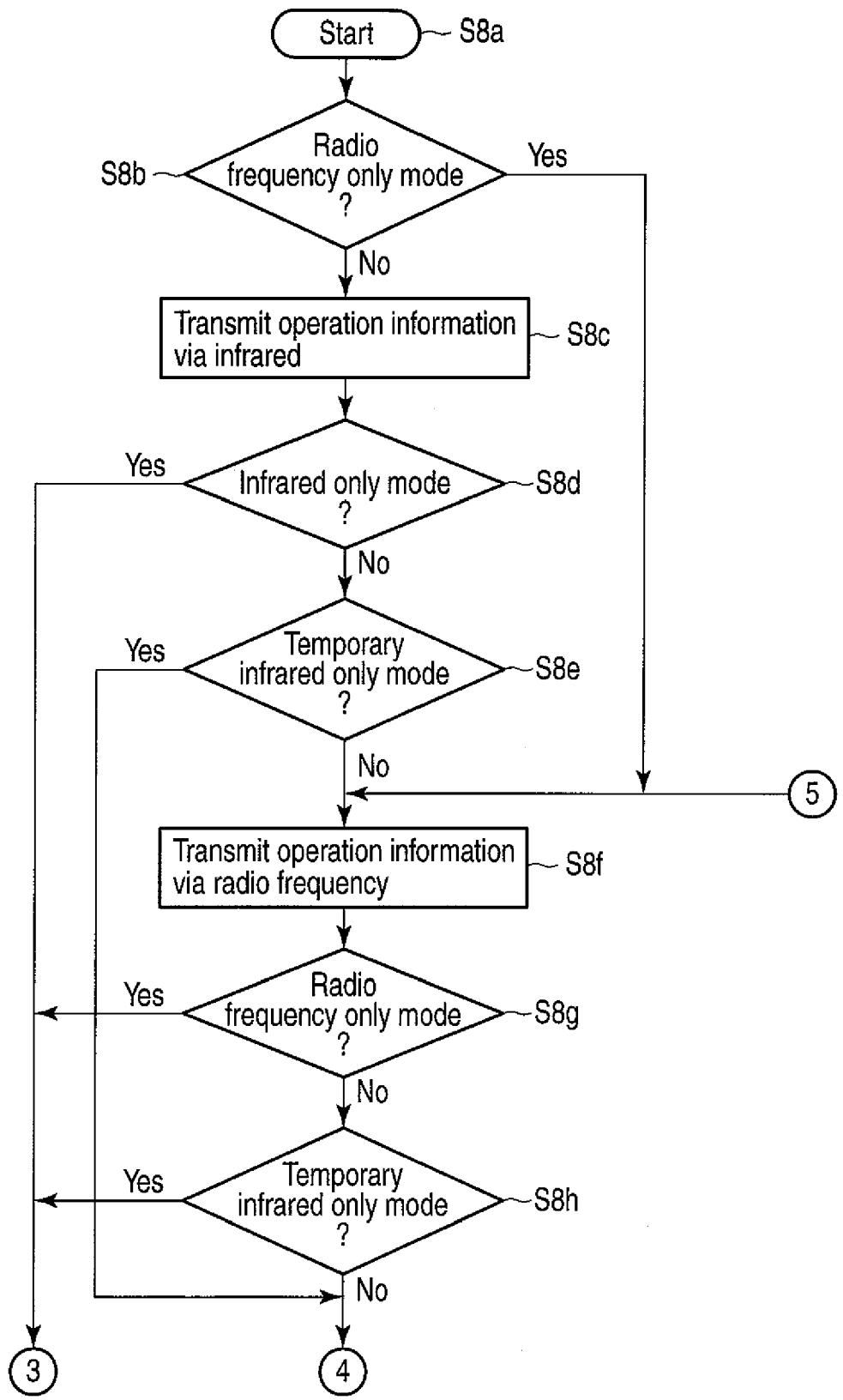
FIG. 8 is a flowchart to explain part of another operation executed by the optical disk reproduction apparatus in the embodiment.
Figure 9:
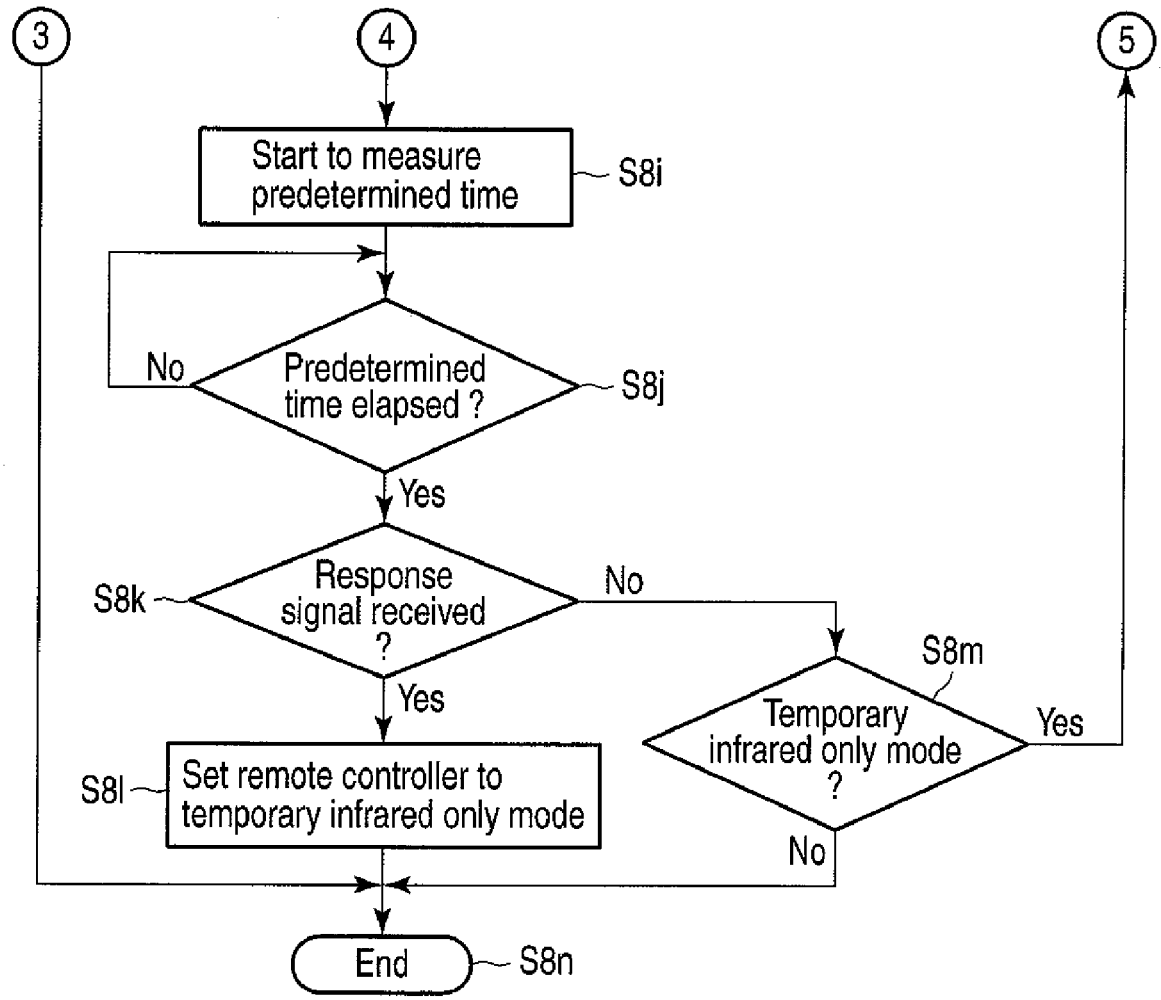
FIG. 9 is a flowchart to explain the remainder of another operation executed by the optical disk reproduction apparatus in the embodiment.

FIGS. 8 and 9 are flowcharts to explain another operation executed by the control module 26 of the remote controller 24. Specifically, any operation key of the operation module 27 is operated, and thereby, the procedure is started (step S8*a*). When the procedure is started, the control module 26 determines in step S8*b* whether or not the remote controller 24 is set to the radio frequency only mode. If it is determined that the remote controller 24 is not set to the radio frequency only mode (NO), the control module 26 causes the infrared transmitting module 28 to transmit the operation information corresponding to the operated key in step S8*c*.

Thereafter, the control module 26 determines in step S8*d* whether or not the remote controller 24 is set to the infrared only mode. If it is determined that the remote controller 24 is set to the infrared only mode (YES), the control module 26 ends the procedure (step S8*n*). Conversely, if it is determined that the remote controller 24 is not set to the infrared only mode (NO), the control module 26 determines in step S8*e* whether or not the remote controller 24 is set to the temporary infrared only mode.

If it is determined in step S8*e* that the remote controller 24 is not set to the temporary infrared only mode (NO), or if it is determined in step S8*b* that the remote controller 24 is not set to the temporary radio frequency only mode (YES), the control module 26 performs the following procedure. Namely, in step S8*f*, the control module 26 causes the radio frequency transmitting module 29 to transmit the operation information corresponding to the operated key.

Thereafter, the control module 26 determines in step S8*g* whether or not the remote controller 24 is set to the radio frequency only mode. If it is determined that the remote controller 24 is set to the radio frequency only mode (YES), the control module 26 ends the procedure (step S8*n*).

Conversely, if it is determined in step S8*g* that the remote controller 24 is not set to the radio frequency only mode (NO), the control module 26 determines in step S8*h* whether or not the remote controller 24 is not set to the temporary infrared only mode. If it is determined that the remote controller 24 is not set to the temporary infrared only mode, the control module 26 ends the procedure (step S8*n*).

If it is determined in step S8*h* that the remote controller 24 is not set to the temporary infrared only mode (NO), or if it is determined in step S8*e* that the remote controller 24 is not set to the temporary infrared only mode (YES), the control module 26 performs the following procedure. Namely, in step S8*i*, the control module 26 starts to measure a predetermined time using a built-in timer (not shown).

Then, the control module 26 determines in step S8*j* whether or not the predetermined time has elapsed. If it is determined that the predetermined has time elapsed (YES), the control module 26 determines in step S8*k* whether or not the radio frequency receiving module 30 receives a response signal indicative that operation information is received via infrared. If it is determined that the response signal is received (YES), in step S8*l*, the control module 26 sets the remote controller 24 to the temporary infrared only mode, and then, ends the procedure (step S8*n*).

Conversely, if it is determined in step S8*k* that the response signal is not received within the predetermined time (NO), the control module 26 determines in step S8*m* whether or not the remote controller 24 is set to the temporary infrared only mode. If it is determined that the remote controller 24 is not set to the temporary infrared only mode (NO), the control module 26 ends the procedure (step S8*n*).

Conversely, it is determined in step S8*m* that the remote controller 24 is set to the temporary infrared only mode (YES), the control module 26 returns to the procedure of step S8*f*. Then, the control module 26 causes the radio frequency transmitting module 29 to again transmit the operation information corresponding to the operated key.

In other words, in a state that the remote controller 24 is set to the temporary infrared only mode, the response signal via a radio frequency from the optical disk reproduction apparatus 11 is not received within the predetermined time after operation information is transmitted via infrared. In this case, the same content operation information is again transmitted without releasing the temporary infrared only mode. Therefore, this serves to securely transmit the operation information to the optical disk reproduction apparatus 11.

Figure 10:
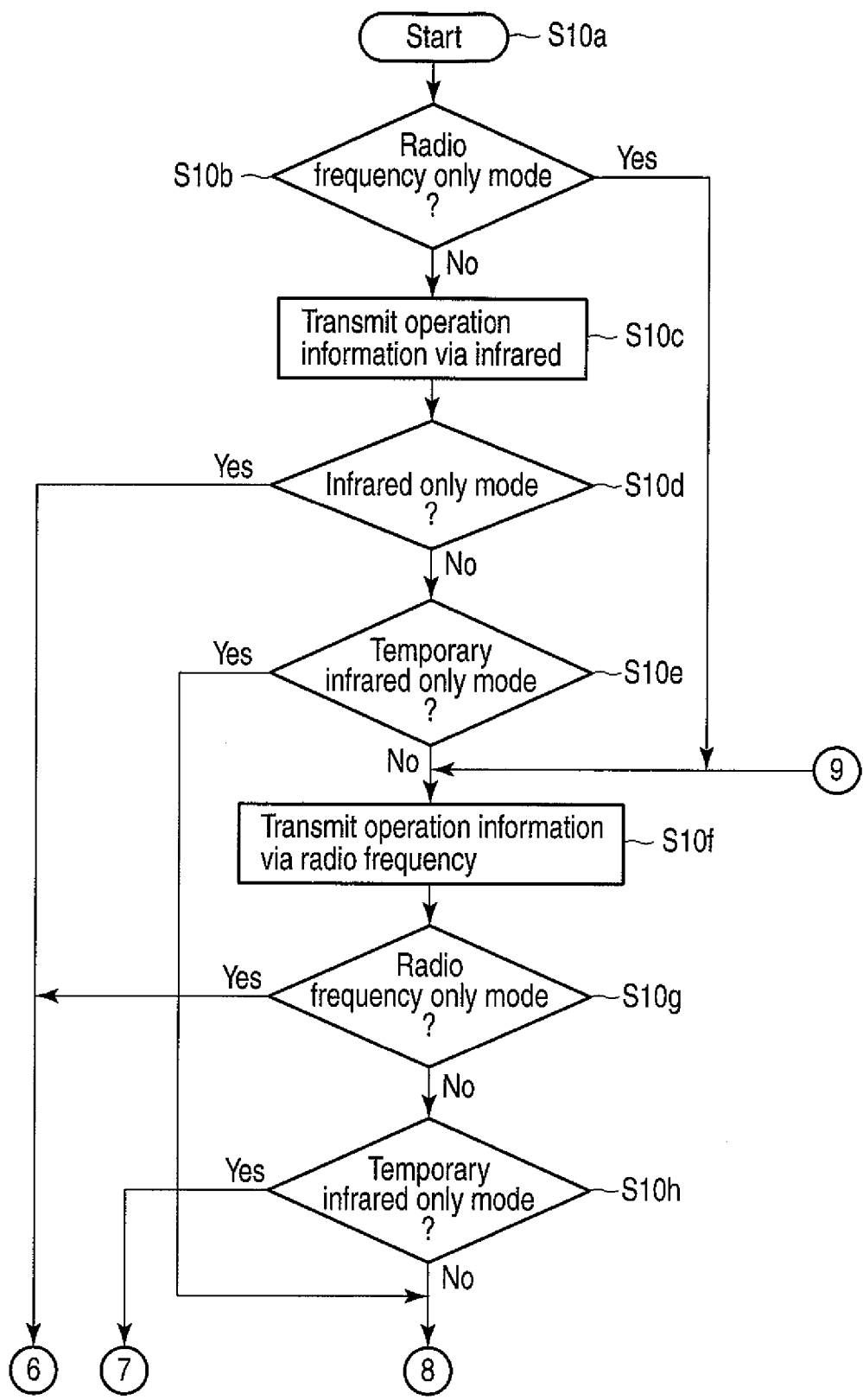
FIG. 10 is a flowchart to explain part of another operation executed by the optical disk reproduction apparatus in the embodiment.
Figure 11:
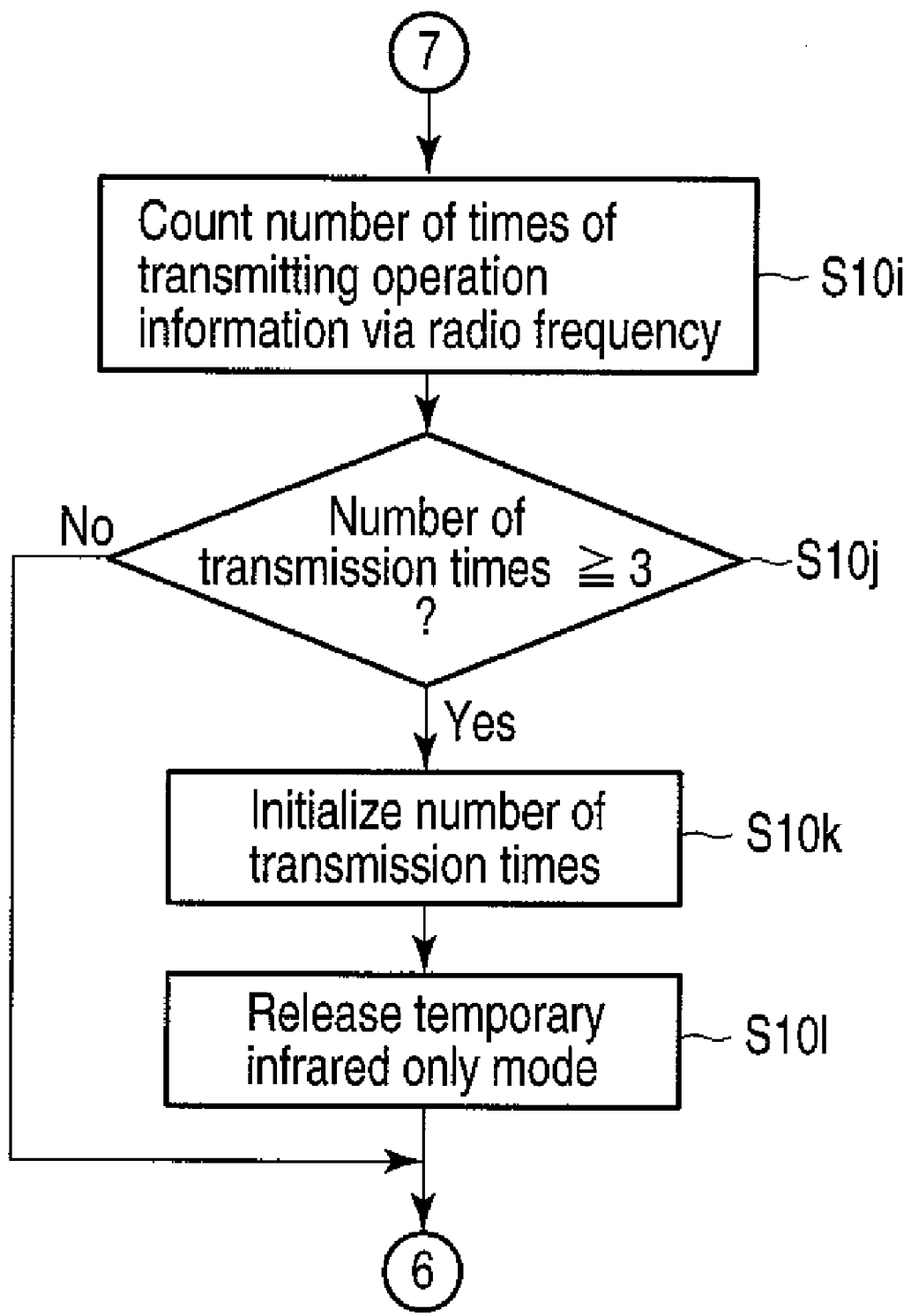
FIG. 11 is a flowchart to explain part of a further operation executed by the optical disk reproduction apparatus in the embodiment.
Figure 12:
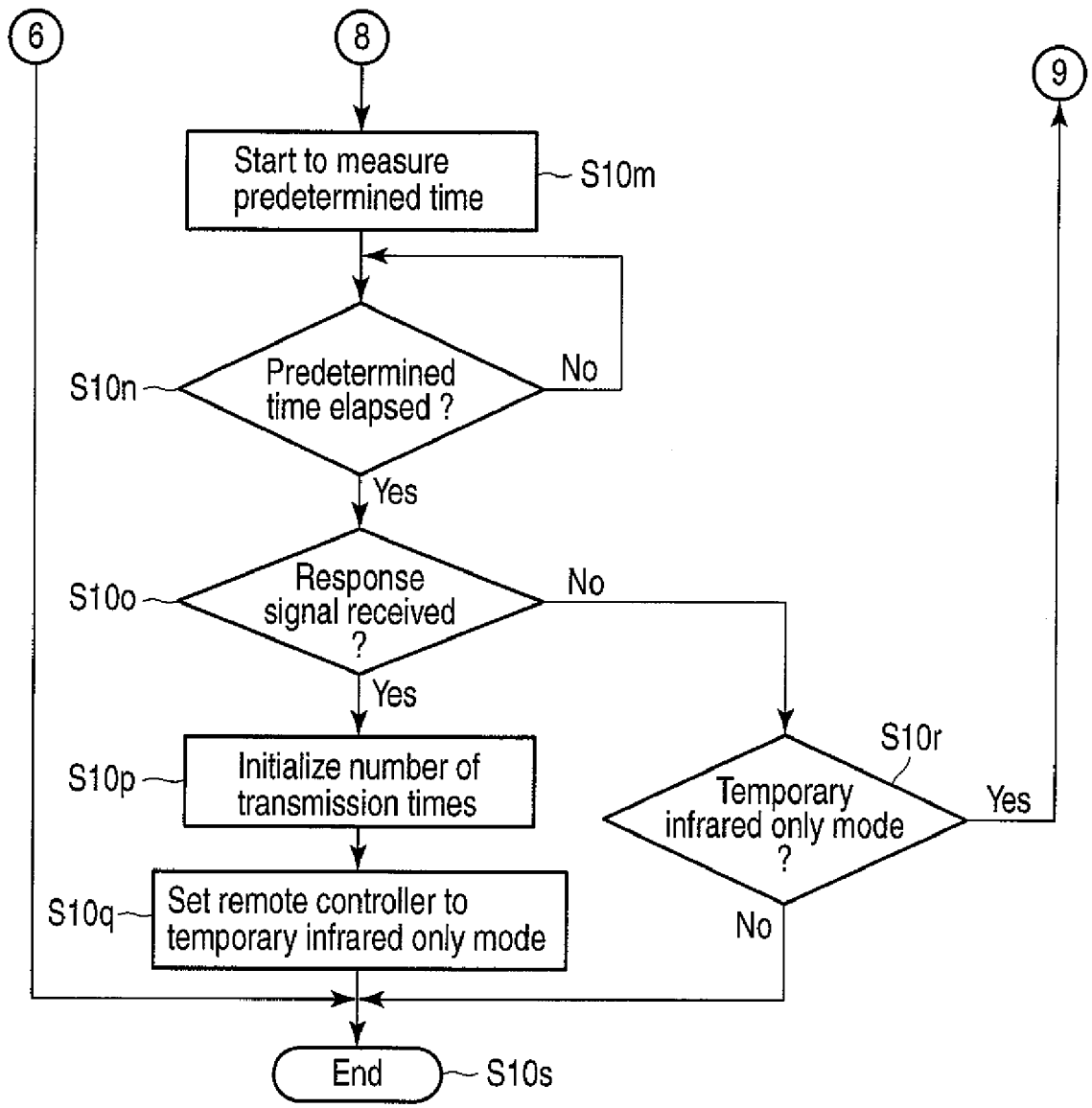
FIG. 12 is a flowchart to explain the remainder of another operation executed by the optical disk reproduction apparatus in the embodiment.

FIGS. 10 to 12 are flowcharts to explain another operation executed by the control module 26 of the remote controller 24. Specifically, any operation key of the operation module 27 is operated, and thereby, the procedure is started (step S10*a*). When the procedure is started, the control module 26 determines in step S10*b* whether or no the remote controller 24 is set to the radio frequency only mode. If it is determined that the remote controller 24 is not set to the radio frequency only mode (NO), in step S10*c*, the control module 26 causes the infrared transmitting module 28 to transmit the operation information corresponding to the operated key.

Thereafter, the control module 26 determines in step S10*d* whether or not the remote controller 24 is set to the infrared only mode. If it is determined that the remote controller 24 is set to the infrared only mode (YES), the control module ends the procedure (step S10*s*). Conversely, if it is determined that the remote controller 24 is not set to the infrared only mode (NO), the control module 26 determines in step S10*e* whether or not the remote controller 24 is set to the temporary infrared only mode.

If it is determined in step S10*e* that it is determined that the remote controller 24 is not set to the temporary infrared only mode (NO), or if it is determined in step S10*b* that the remote controller 24 is set to the radio frequency only mode (YES), the control module 26 causes the radio frequency transmitting module 29 to transmit the operation information corresponding to the operated key in step S10f.

Thereafter, the control module 26 determines in step S10g whether or not the remote controller 24 is set to the radio frequency only mode. If it is determined that the remote controller 24 is set to the radio frequency only mode (YES), the control module 26 ends the procedure (step S10s).

Conversely, if it is determined that the remote controller 24 is not set to the radio frequency only mode (NO), the control module 26 determines in step S10h whether or not the remote controller 24 is set to the temporary infrared only mode. If it is determined that the remote controller 24 is set to the temporary infrared only mode (YES), in step S100, the control module 26 performs the following procedure. Namely, the control module 26 counts the number n of times of transmitting operation information via a radio frequency because the response signal is not received.

Then, the control module 26 determines in step S10j whether or not the number n of times of transmitting operation information via a radio frequency is more than a preset threshold (e.g., three (3) times). If it is determined that the number n of transmitted times is less than the threshold (NO), the control module 26 ends (step S10s).

Conversely, it is determined in step S10j that the number n of times of transmission is more than the threshold (YES), the control module 26 initializes a count value of the number n of times transmitting operation information via a radio frequency because the response signal is not received, in step S10k. Thereafter, in step S101, the control module 26 releases the temporary infrared only mode, and then, ends the procedure (step S10s).

Conversely, if it is determined in step S10h that the remote controller 24 is not set to the temporary infrared only mode (NO), or if it is determined in step S10e that the remote controller 24 is set to the temporary infrared only mode (YES), the control module 26 performs the following procedure. Namely, the control module 26 starts to measure a predetermined time using a built-in timer (not shown) in step S10m.

Thereafter, the control module 26 determines in step S10n whether or not the predetermined time has elapsed. If it is determined that the predetermined time has elapsed (YES), the control module 26 determines in step S10o whether or not the radio frequency receiving module 30 receives a response signal indicative that operation information is received via infrared.

If it is determined that the response signal is received (YES), the control module 26 initializes a count value of the number n of times of transmitting operation information via a radio frequency because the response signal is not received, in step S10p. Thereafter, in step S10q, the control module 26 set the remote controller 24 to the temporary infrared only mode, and then, ends the procedure (step S10s).

Conversely, if it is determined in step S10o that the response signal is not received within the predetermined time (NO), the control module 26 determines in step S10r whether or not the remote controller 24 is set to the temporary infrared only mode. If it is determined that the remote controller 24 is not set to the temporary infrared only mode (NO), the control module 26 ends the procedure (step S10s).

Conversely, if it is determined in step S10r that the remote controller 24 is set to the temporary infrared only mode (YES), the control module 26 returns to the procedure of step S10f. Then, the control module 26 causes the radio frequency transmitting module 29 to again transmit the operation information corresponding to the operated key.

In other words, in a state that the remote controller 24 is set to the temporary infrared only mode, the response signal via a radio frequency from the optical disk reproduction apparatus 11 is not received within the predetermined time after operation information is transmitted via infrared. For this reason, the number n of times of transmitting the same content operation information via a radio frequency is counted. When the number n of times is more than the preset threshold, the temporary infrared only mode is automatically released.

In this way, even if the remote controller 24 is moved to a position where operation information via infrared does not reach the optical disk reproduction apparatus 11, the temporary infrared only mode is automatically released. Thus, the remote controller is changed to remote control via a radio frequency, so that the operation information is securely transmitted to the optical disk reproduction apparatus 11. When the temporary infrared only mode is released, it is effective to automatically set the remote controller 24 to the combination mode.

Figure 13:
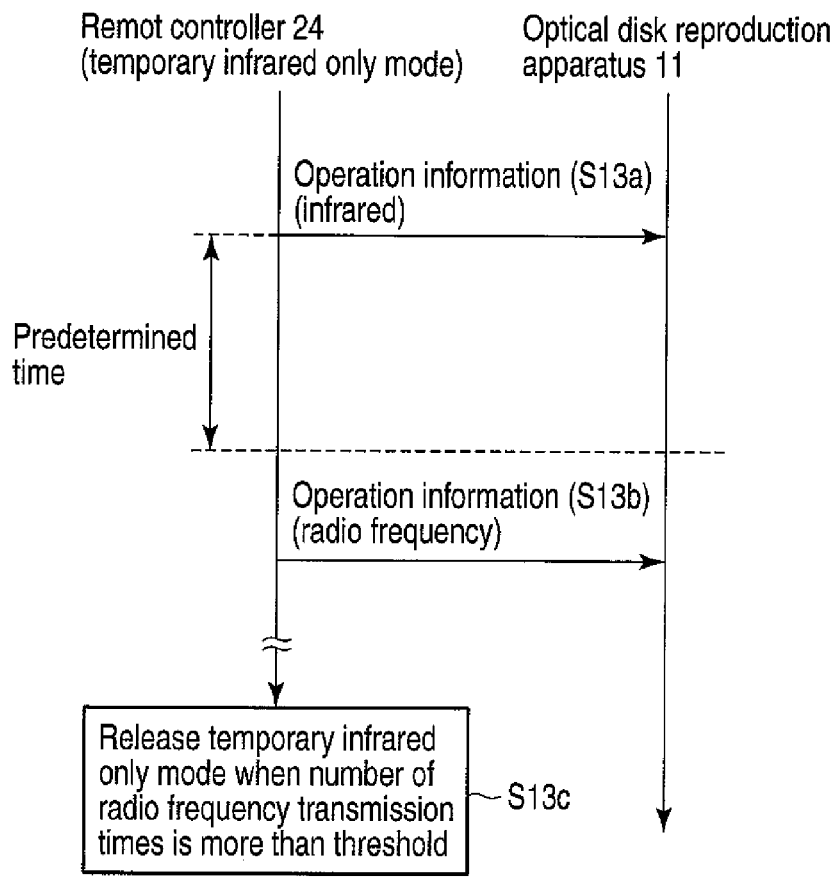
FIG. 13 is a view to explain another operation sequence of an optical disk reproduction apparatus and a remote controller in the embodiment.

FIG. 13 shows an operation sequence executed by the optical disk reproduction apparatus 11 and the remote controller 24 based on the flowcharts shown FIGS. 8 to 12. Specifically, as seen from step S13a, the remote controller 24 set to the temporary infrared only mode transmits operation information via infrared. Thereafter, if a response signal is not obtained from the optical disk reproduction apparatus 11 within a predetermined time, as depicted in step 13b, the remote controller 24 transmits the same content operation information via a radio frequency.

Thus, the number n of times of transmitting the operation information via a radio frequency is more than the preset threshold because the response signal is not obtained from the optical disk reproduction apparatus 11. In this case, as shown in step S13c, the remote controller 24 is controlled to automatically release the temporary infrared only mode.

Figure 14:
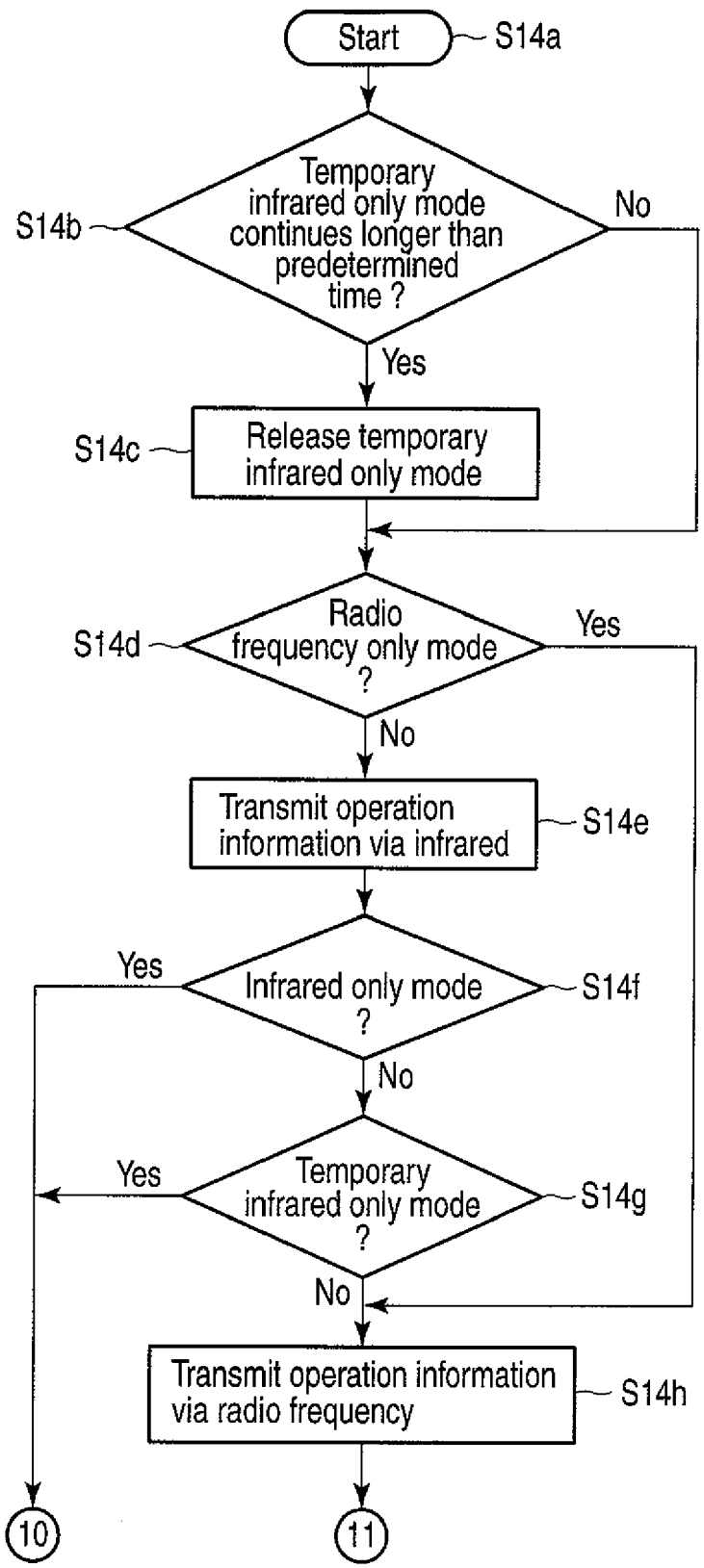
FIG. 14 is a flowchart to explain part of a further operation executed by the optical disk reproduction apparatus in the embodiment.
Figure 15:
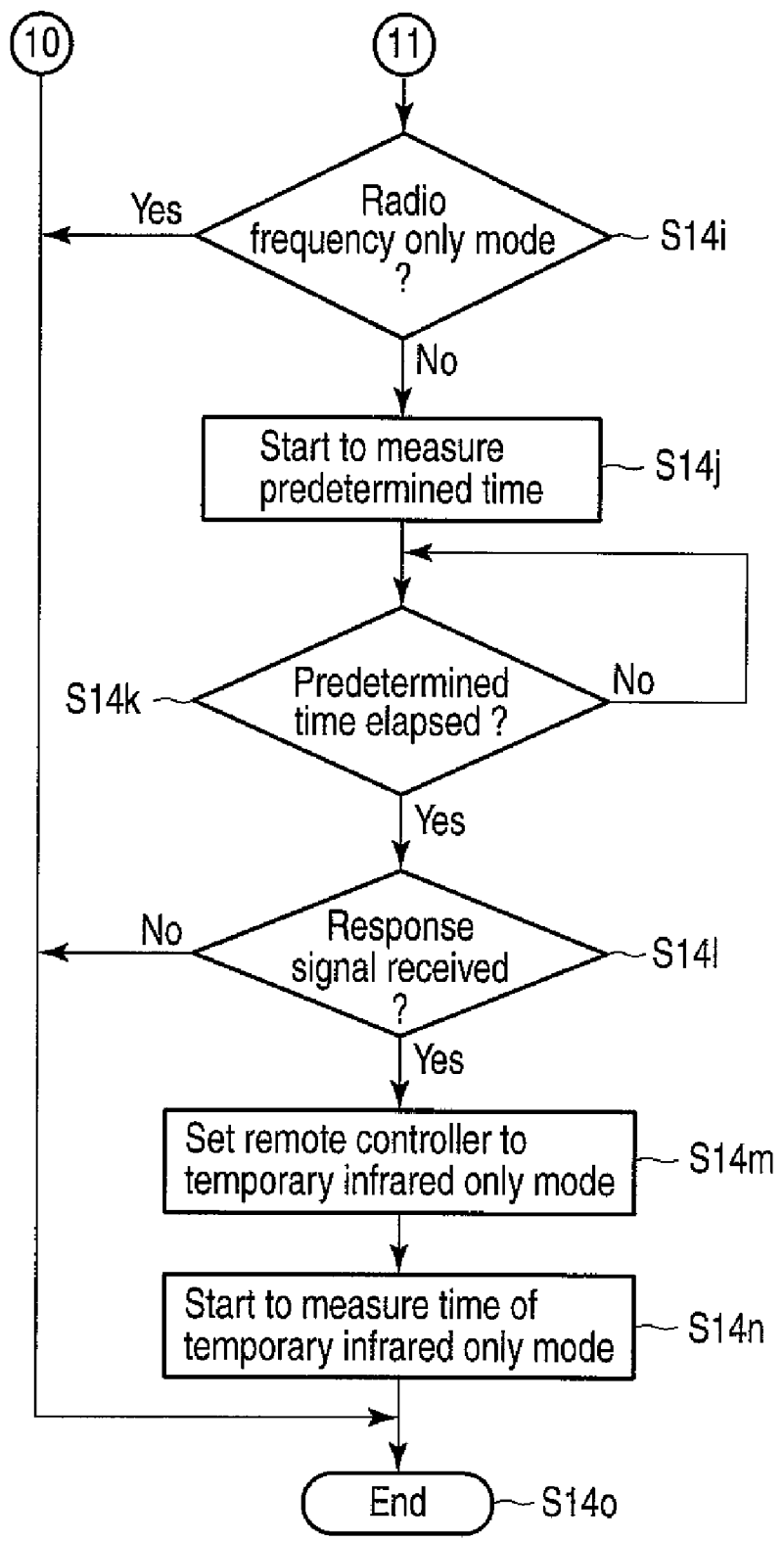
FIG. 15 is a flowchart to explain the remainder of another operation executed by the optical disk reproduction apparatus in the embodiment.

FIGS. 14 and 15 are flowcharts to explain another operation executed by the control module 26 of the remote controller 24. Specifically, any operation key of the operation module 27 is operated, and thereby, the procedure is started (step S14a). When the procedure is started, the control module 26 determines in step S14b whether or not a predetermined time (e.g., one minute) has elapsed after the remote controller 24 is set to the temporary infrared only mode. If it is determined that the predetermined time has elapsed (YES), the control module 26 automatically releases the temporary infrared only mode in step S14c.

After the foregoing step S14c, or if it is determined that the predetermined time does not elapse after the remote controller 24 is set to the temporary infrared only mode (NO), the control module 26 determines in step S14d whether or not the remote controller 24 is set to the radio frequency only mode. If it is determined that the remote controller 24 is not set to the radio frequency only mode (NO), the control module 26 causes the infrared transmitting module to transmit the operation information corresponding to the operated key in step S14e.

Thereafter, the control module 26 determines in step S14f whether or not the remote controller 24 is set to the infrared only mode. If it is determined that the remote controller 24 is set to the infrared only mode (YES), the control module 26 ends the procedure (step S14o). Conversely, if it is determined that the remote controller 24 is not set to the infrared only mode (NO), the control module 26 determines in step S14g whether or not the remote controller 24 is set to the temporary infrared only mode. If it is determined that the remote controller 24 is set to the temporary infrared only mode (YES), the control module 26 ends the procedure (step S14o).

Conversely, if it is determined in step S14g that the remote controller 24 is not set to the temporary infrared only mode (NO), or if it is determined in step S14d that the remote controller 24 is set to the radio frequency only mode (YES), in step S14h, the control module 26 performs the following procedure. Namely, the control module 26 causes the radio frequency transmitting module 29 to transmit the operation information corresponding to the operated key.

Thereafter, the control module 26 determines in step S14i whether or not the remote controller 24 is set to the radio frequency only mode. If it is determined that the remote controller 24 is set to the radio frequency only mode (YES), the control module 26 ends the procedure (step S140). Conversely, if it is determined that the remote controller 24 is not set to the radio frequency only mode (NO), the control module 26 starts to measure a predetermined time using a built-in timer (not shown) in step S14j.

Then, the control module 26 determines in step S14k whether or not the predetermined time has elapsed. If it is determined that the predetermined time has elapsed (YES), the control module 26 determines in step S14l whether or not the radio frequency receiving module 30 receives a response signal indicative that operation information is received via infrared. If it is determined that the response signal is not received (NO), the control module 26 ends the procedure (step S14o).

Conversely, it is determined in step S14l that the response signal is received (YES), the control module 26 sets the remote controller 24 to the temporary infrared only mode in step S14m. In step S14n the control module starts to measure time after the remote controller 24 to the temporary infrared only mode, and then, ends the procedure (step S140).

In other words, the temporary infrared only mode is automatically released in the following cases. One is the case where when the remote controller 24 is set to the temporary infrared only mode, the operation key is operated; nevertheless operation information via infrared is not transmitted within the predetermined time (e.g., one minute) after the foregoing setting. Another is the case where operation information via infrared is transmitted; nevertheless, the response signal is not received.

In this way, even if the remote controller 24 is moved to a position where operation information via infrared does not reach the optical disk reproduction apparatus 11, the temporary infrared only mode is automatically released. Thus, the remote controller is changed to remote control via a radio frequency, so that the operation information is securely transmitted to the optical disk reproduction apparatus 11.

Figure 16:
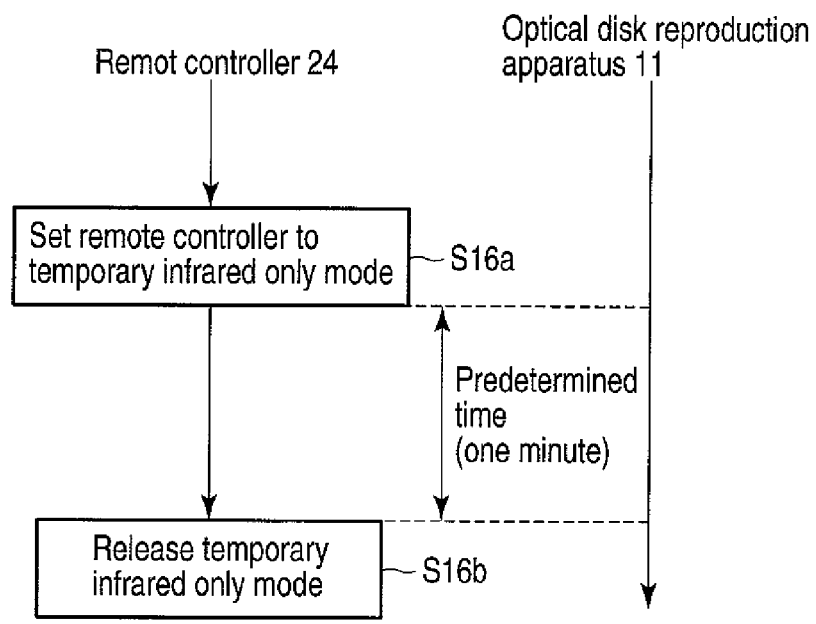
FIG. 16 is a view to explain a further operation sequence of an optical disk reproduction apparatus and a remote controller in the embodiment.

FIG. 16 shows an operation sequence executed by the optical disk reproduction apparatus 11 and the remote controller 24 based on the flowcharts shown FIGS. 14 and 15. Specifically, as shown in step S16b, the temporary infrared only mode is released in the following cases. One is, as shown in step S16a, the case where the remote controller 24 does not transmit operation information via infrared within the predetermined time after the remote controller 24 is set to the temporary infrared only mode. Another is the case where the operation information is transmitted via infrared; nevertheless, the response signal is not received.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audio-visual apparatus comprising:
a controlled apparatus; and
a remote controller,
the controlled apparatus comprising:
an infrared ray receiver configured to receive a command using infrared rays;
a radio wave receiver configured to receive a command using radio waves;
a controller configured to accept the command received by at least one of the infrared receiver and the radio wave receiver, and to control a plurality of modules to a state corresponding to the command; and
a radio wave transmitter configured to transmit a response signal via radio waves, the response signal being indicative that the infrared receiver has received the command,
the remote controller comprising:
an infrared transmitter configured to transmit a command using infrared rays;
a radio wave transmitter configured to transmit a command using radio waves;
a radio wave receiver configured to receive a response signal transmitted from the controlled apparatus; and
a setting controller configured to automatically switch the remote controller to a temporary infrared only mode transmitting a command by the infrared transmitter from a combination mode when the radio wave receiver receives the response signal within a predetermined time after the command is transmitted while the remote controller is in the combination mode transmitting the command from both the infrared transmitter and the radio wave transmitter.

2. The apparatus of claim 1, wherein the setting controller of the remote controller is configured to hold the combination mode if the radio wave receiver has not received the response signal to the command within a predetermined time after the command is transmitted in the combination mode.

3. The apparatus of claim 1, wherein the setting controller of the remote controller is configured to cause the radio wave transmitter to transmit the command a plurality of times if the radio wave receiver has not received the response signal within a predetermined time after the command is transmitted while the remote controller is in the temporary infrared only mode.

4. The apparatus of claim 1, wherein the setting controller of the remote controller is configured to cancel the temporary infrared only mode if the radio wave receiver has not received the response signal within a predetermined time after the command is transmitted while the remote controller is in the temporary infrared only mode, and when the number of the plurality of times of transmitting the command from the radio wave transmitter exceeds a preset threshold.

5. The apparatus of claim 4, wherein the setting controller of the remote controller is configured to automatically set the remote controller to the combination mode when the setting controller cancels the temporary infrared only mode.

6. The apparatus of claim 1, wherein the setting controller of the remote controller is configured to cancel the temporary infrared only mode when the command has not been transmitted within a predetermined time after the remote controller is set to the temporary infrared only mode.

7. The apparatus of claim 1, wherein the setting controller of the remote controller is configured to cancel the temporary infrared only mode if the response signal has not been received within a predetermined time after the remote controller is set to the temporary infrared only mode.

8. A method of controlling an audio-visual (AV) apparatus, comprising:

transmitting a command from a remote controller in a combination mode which is transmitting the command using both infrared rays and radio waves;

receiving the command via the infrared rays from the remote controller;

transmitting a response signal to the received command via radio waves;

receiving the response signal via radio waves from the AV apparatus at the remote controller; and automatically switching the remote controller to a temporary infrared only mode of transmitting via the infrared rays only from the combination mode when the remote controller receives a signal via the radio waves, in response to the command via the infrared rays, from the AV apparatus within a predetermined time after the remote controller transmits the command via the infrared rays.

* * * * *